March 22, 1960  R. C. DAVIS  2,929,101
APPARATUS FOR MANUFACTURING RUBBERIZED FABRIC ARTICLES
Filed Dec. 11, 1956  2 Sheets-Sheet 1

INVENTOR.
RALPH C. DAVIS
BY
W. A. Fraser
ATTY.

March 22, 1960 R. C. DAVIS 2,929,101
APPARATUS FOR MANUFACTURING RUBBERIZED FABRIC ARTICLES
Filed Dec. 11, 1956 2 Sheets-Sheet 2

INVENTOR.
RALPH C. DAVIS
BY
*W. A. Fraser*
ATTY.

United States Patent Office 2,929,101
Patented Mar. 22, 1960

2,929,101

APPARATUS FOR MANUFACTURING RUBBERIZED FABRIC ARTICLES

Ralph Charles Davis, Akron, Ohio, assignor to The Firestone Tire & Rubber Company, Akron, Ohio, a corporation of Ohio Application December 11, 1956, Serial No. 627,580

4 Claims. (Cl. 18—17)

The present invention relates generally to apparatus for use in the manufacture of rubberized fabric articles. More particularly, the invention relates to apparatus for the shaping and curing of rubberized fabric articles. Specifically, the invention relates to the shaping and curing, or vulcanization, of single convolution air spring bellows suitable for use in the suspension system of a vehicle.

In the course of manufacturing single convolution air spring bellows having opposed beads of materially different diameters, the first stage of manufacture involves the preparation or assembly on a suitable mandrel of a tube having multiple plies of rubberized fabric with cords which preferably extend at an angle of about 5°–25° to the axis of the bellows, the cords of one ply crossing the cords of the other. The interior of the bellows has a soft lining of rubber, preferably neoprene because of its oil resistant properties, to retain air within the bellows. The ends of the plies are wrapped about and anchored to circular beads of materially different diameters so that in the cured bellows, one bead can pass through the other during the working stroke of the bellows.

In the second stage of manufacturing air spring bellows, a fluid impermeable reinforcing member is preferably incorporated within the uncured bellows as an integral part thereof. These members strengthen critical points of wear or applying loads and also, if seated at one end of an air spring bellows in a fluid tight manner, provide a closure for one end of the bellows so as to facilitate the final shaping and curing of the bellows.

In the final stage of manufacture, the uncured bellows with a reinforcing member or closure in place at one end thereof is placed in an apparatus carrying a plurality of axially separable mold sections each having a molding surface conforming to a portion of the finished shape of a cured air spring bellows.

The separable mold sections, preferably three in number and designated as "upper," "middle" and "lower," are closed together with an uncured bellows therein. Concurrently with initiation of the closing movement of the mold sections, a shaping fluid such as air under pressure is introduced into the interior of the uncured bellows from the bottom mold section so as to cause the bellows structure to distend and assume the same configuration as the molding surfaces. The distention of the bellows breaks the pick cords and causes the angle of the rubberized fabric cords to change. If this change in the cord angle occurs too rapidly the outermost surfaces of the uncured bellows will be pinched or unevenly stressed and distorted. In the event that the rubber and fabric cords are cured in the pinched condition, by the introduction of steam or other suitable vulcanizing media into the interior of the bellows, the bellows will be defective exhibiting the phenomenon described as "blistering."

It has been found that blistering and other defects attributable to faulty shaping and curing of a single convolution air spring bellows can be avoided if the shaping fluid is applied in a predetermined sequence or cycle involving the precise use of predetermined pressures of varied magnitude, rather than a substantially unvaried pressure such as has been heretofore known in the art. Immediately following shaping, the curing fluid is also applied in a percise manner so as to further prevent the occurrence of blistering and other defects.

Therefore, it is an object of the invention to provide improvements in apparatus for use in the manufacture of single convolution air spring bellows.

Further, it is an object of the invention to provide improvements in apparatus for the shaping and curing of air spring bellows.

Still further, it is an object to provide improvements in apparatus for the application in precise and predetermined magnitudes of varied shaping pressures and curing temperatures and pressures in the manufacture of air spring bellows.

These and other objects of the invention will be apparent in view of the following detailed description of the invention taken in conjunction with the attached drawings.

Figure 2:
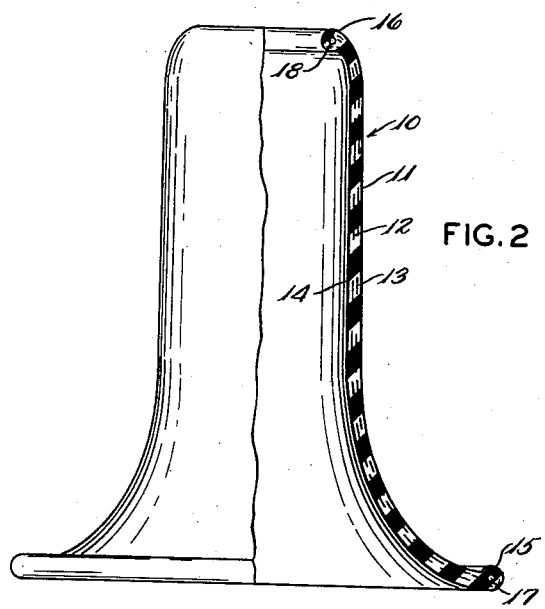
Fig. 2 is a sectional view of an uncured air spring bellows preparation prior to shaping and curing.

The invention includes the application of varied shaping and curing pressures for predetermined periods of time so as to form an uncured air spring bellows indicated generally by the numeral 10 into the finished form air spring bellows indicated generally by the numeral 10A. Referring to Fig. 2, the body 11 of a bellows 10 is preferably of two plies 12 and 13 of rubberized fabric and has a rubber lining 14. The fabric cords of the plies cross each other and are at angles of about 5°–25° to the longitudinal axis of the body 11. The ends of the plies are wrapped about and anchored to a pair of circular beads 15 and 16 which are reinforced by cores 17 and 18, respectively, of steel wire.

Figure 3:
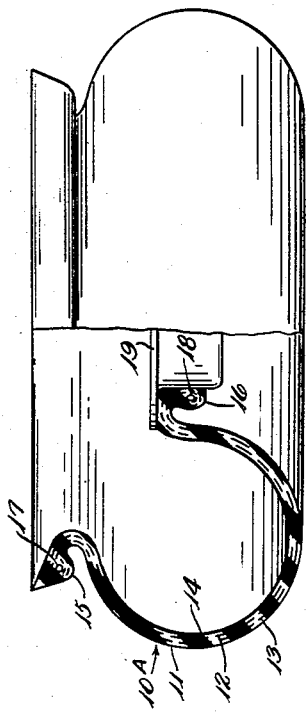
Fig. 3 is a sectional view of a finished air spring bellows.

Referring to Fig. 3, the larger bead 15 of one form of a finished bellows 10A is adapted to be fixed securely to the frame of a vehicle (not shown). The smaller or bottom bead 16, reinforced by a rigid, fluid impermeable closure disk 19 contacts the vehicle road gear.

Figure 1:
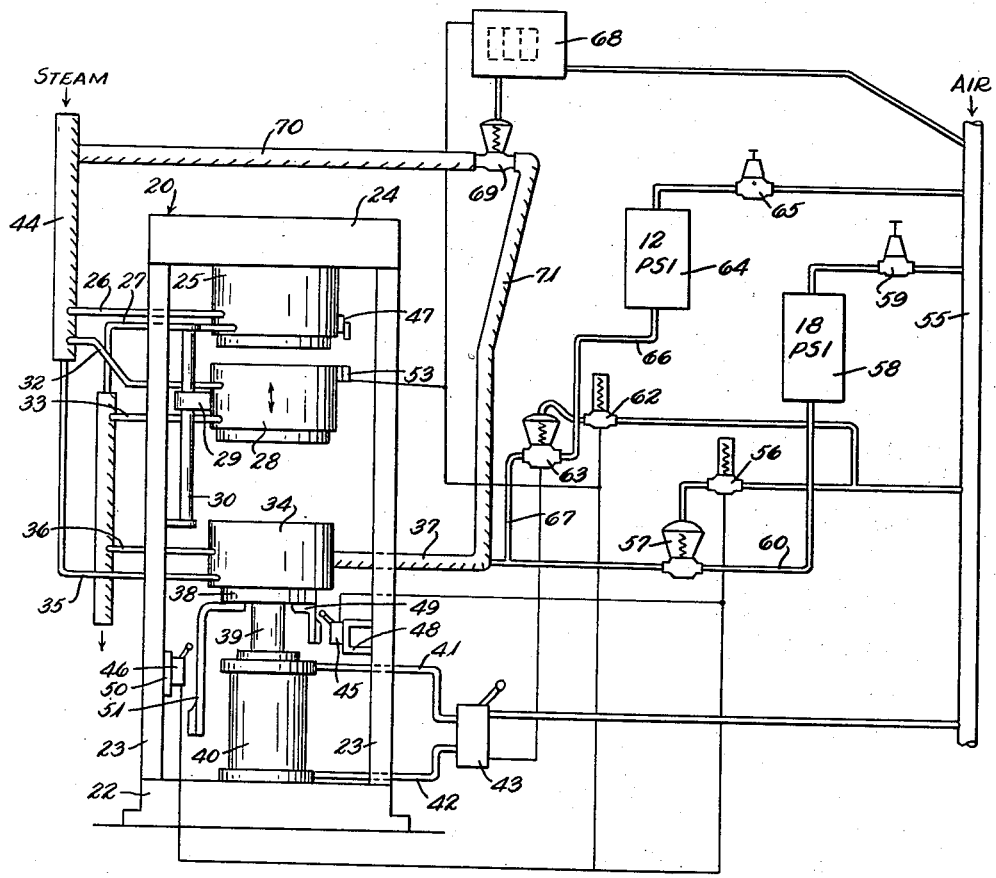
Fig. 1 is a view of a molding apparatus or "press" with the controls, piping and electrical wiring therefor being shown schematically.

Referring to Fig. 1, a suitable press for the shaping and curing of air spring bellows is indicated generally by the numeral 20. The press includes a base 22 and structural frame members 23 connected at the top by a rigid cross member 24. Depending from the cross member 24 is an upper or top mold section 25 having an interior molding surface (not shown) which preferably forms the smaller diameter end portion (bead 16) during the shaping and curing of a finished bellows 10A. The mold section 25 is jacketed in a conventional manner so that steam or other suitable heating media may be continually introduced for heating the molding surface. The steam supply and return lines are indicated at 26 and 27, respectively.

The middle mold section is indicated at 28 and has an interior molding surface (also, not shown) which forms the middle or convoluted portion during the shaping and curing of a finished bellows. The mold section 28 is provided with a side bracket 29 which is mounted around a vertical rod 30 supported at either end by brackets 31 attached to the frame 23. The bracket 29 is so mounted on the rod 30 that the mold section 28 is pivotable in a horizontal plane beneath the upper mold section for purposes of loading an uncured bellows 10 and unloading a finished bellows 10A. The mold section is also vertically slidable on the rod 30 so that the mold sections may be closed together in the manner described below. The mold section 28 is also jacketed in a conventional manner with flexible steam supply and return lines being indicated at 32 and 33, respectively.

The lower or bottom mold section is indicated at 34 and has an interior molding surface (also, not shown) which preferably forms the larger diameter end portion (bead 15) during the shaping and curing of a finished bellows 10A. The mold section 34 is also jacketed in a conventional manner with flexible steam supply lines being indicated at 35 and 36, respectively. An insulated flexible line 37, referred to below, communicates with the interior of the mold section through conventional interior passages (not shown). The lower mold section is mounted, in axial alignment with the upper mold section 25, on a plate 38 attached to the end of a piston rod 39 of a suitable fluid pressure operated cylinder 40. The cylinder 40 is mounted on the base 22 and is connected by supply and return lines, 41 and 42 respectively, to a control valve 43.

In the case of each mold section, the steam jacket supply lines 26, 32 and 36, are connected to a steam header 44 supplying steam under elevated curing temperatures and pressures, for example 300° F. and 52 p.s.i.

The closing movements of the mold sections 25, 28 and 34 are signalled by conventional electrical limit switches 45, 46 and 47 which control the application of the shaping and curing media. The normally open limit switch 45 is mounted on a bracket 48 attached to a frame member 23. Switch 45 is closed by an actuating member 49 attached to the plate 38 when the piston rod 39 is extended to initiate closing together of the mold sections.

The normally open limit switch 46 is mounted on a bracket 50 attached to a frame member 23 opposite of bracket 48. Switch 46 is closed, subsequent to the closing of switch 45, by an actuating member 51 attached to the plate 38 opposite the member 49.

The third limit switch 47, also normally open, is mounted on the upper mold section 25 so as to be actuated by a cam member 53 on the middle mold section 28 when the mold sections are fully closed.

If desired, the fluid pressure for operation of the apparatus 20 may be supplied from a high pressure (for example 80 p.s.i.) air line 55. Closing of the limit switch 45 energizes a solenoid valve 56 which opens a diaphragm valve 57 coupled with the solenoid valve. The valve 57 controls the flow of air from a first reservoir tank 58. The air in tank 58 is under a pressure of preferably 18 p.s.i. and is supplied from the line 55 through a pressure reducing valve 59. The tank 58 is connected by a supply line 60 to the valve 57. The valve 57 is connected to the lower mold section 34 by the mold line 37.

Closing of the limit switch 46 energizes a second solenoid valve 62 which opens a second coupled diaphragm valve 63. The valve 63 controls the flow of air from a second reservoir tank 64. The air in tank 64 is under a pressure of preferably 12 p.s.i. and is supplied from the line 55 through a pressure reducing valve 65. The tank 64 is connected by a supply line 66 to the valve 63. The valve 63 is connected to the mold line 37, behind valve 57, by a line 67. The closing of limit switch 46 also deenergizes the first solenoid valve 56 closing the coupled valve 57 to shut off the flow of 18 p.s.i. air from the tank 58.

Closing of the third limit switch 47 deenergizes the second solenoid valve 62 closing the coupled valve 63 to shut off the flow of 12 p.s.i. air from the tank 64. The closing of limit switch 47 also starts the timing cycle of a suitable time control device indicated at 68. As the timing cycle commences, a third diaphragm valve 69 is opened by the timer 68. The valve 69 controls the flow of steam at curing temperatures and pressures, for example 370° F. and 170 p.s.i. from the steam header 44. An insulated line 70 connects the steam header with the valve 69. The valve 69 is connected to the mold line 37, behind the valve 63, by an insulated line 71.

Figure 4:
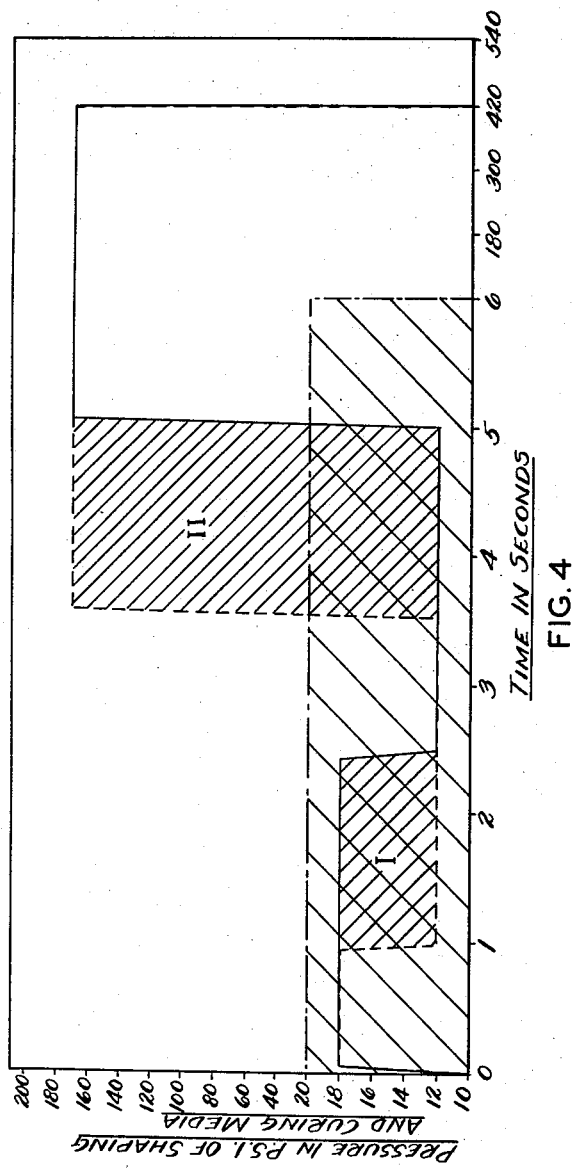
Fig. 4 is a chart or graph of a shaping and curing pressure/time cycle, with pressure being the ordinate and time the abscissa.

The operation of the apparatus 20 to shape and cure a finished bellows 10 requires the use of shaping and curing pressures of a predeterminately varied magnitude, as shown in Fig. 4. Fig. 4 is a chart on which the abscissa represents time in seconds and the ordinate represents pressure in p.s.i. The rectangular area in the lower left area of Fig. 4, as delineated by the chain line and the widely spaced cross hatching includes the time from 0 to 6 seconds and 10 to 20 p.s.i. The remaining area of Fig. 4 is on a smaller scale and includes time from 60 to 540 seconds (1 to 9 minutes) and pressure from 20 to 200 p.s.i.

The application of 18 p.s.i. air pressure to the interior of a secured bellows structure 10 may be for a period of from 1 to 2.5 seconds. During this time the pick cords are broken and the angle of the crossed cords in the fabric plies is gradually changed. The application of 12 p.s.i. air pressure to the interior of a structure 10 also may be for a period of from 1 to 2.5 seconds, during which time the new angular relation of the cords is stabilized without pinching or unevenly distorting the outer surface of the bellows. However, it is necessary that the shaping pressure be applied for a period of not less than 3.5 and not more than 5 seconds. Following the period of application of shaping pressure, the curing media (steam at 370° F. and 170 p.s.i.) is introduced into the interior of the bellows structure for a period of from six to eight minutes.

Referring to Fig. 4, the solid line represents the application of 18 p.s.i. air pressure for 2.5 seconds, 12 p.s.i. air pressure for 2.5 seconds and 170 p.s.i. steam pressure for about seven minutes. The dotted line represents the application of 18 p.s.i. air pressure for the minimum period of 1 second, 12 p.s.i. air pressure for 2.5 seconds and 170 p.s.i. steam pressure for about seven minutes. The cross hatched area indicated by the symbol I, between the solid and dotted lines, depicts that period of time during which the air pressure may be either 18 p.s.i. 12 p.s.i. or an intermediate pressure of brief duration. The larger cross hatched area, indicated by the symbol II, depicts that period of time during which the pressure may be either 12 p.s.i. air or 170 p.s.i. steam.

The first step in forming a bellows 10A is securing or clamping the larger diameter end (bead 15) of an uncured tubular structure 10 to a lower mold section 35. The control valve 43 is concurrently actuated so as to cause the piston 39 to be extended from the cylinder 40 and initiate closing together of the three mold sections.

As the lower mold section rises toward and approaches the middle mold section 28, the actuating member 49 closes limit switch 45 and the flow of 18 p.s.i. air commences. The duration of such flow (1 to 2.5 seconds) is controlled by the location of the second limit switch 46 and the actuating member 51. When switch 46 is closed the flow of 18 p.s.i. air is cut off and the flow of 12 p.s.i. air commences, the direction of flow being from the structure 10 through line 67 and valve 63 into the 12 p.s.i. tank 64.

The duration of the flow of 12 p.s.i. air (1 to 2.5 seconds) is controlled by the third limit switch 47 which is closed when the middle mold section 28 is in contact with the upper mold section 25. When switch 47 is closed the flow of 12 p.s.i. air is cut off and the flow of 170 p.s.i. steam commences.

The use of air under first a pressure of 18 p.s.i. and then a pressure of 12 p.s.i. as the shaping media represents the preferred form of the invention. The use of air is preferred because of the availability in a plant of a supply of compressed air. However, other fluids, including water, steam or oils which would not attack the rubber plies or lining could also be used as the shaping media.

The 18 p.s.i. and 12 p.s.i. pressures are suitable for the shaping of a finished bellows (Fig. 3) in which the bottom bead 16 has an external diameter of about 2¾", the top bead 15 has an external diameter of about 5¾", and the convoluted portion has a diameter of from 8" to 11" at its widest point. In the event that the invention is employed for manufacturing air spring bellows having a similar form but with different dimensions, it may be necessary to employ somewhat different shaping pressures. However, in any event the shaping media is first applied at a pressure sufficient to quickly distend the plies 12 and 13, breaking the pick cords if necessary, to conform with the molding surfaces. After the initial distention, the pressure is reduced so as to substantially maintain the distention and yet allow the fabric cords to be displaced and become stabilized in their distended position. The reduced pressure is not sufficient to cause the plies, particularly the rubber portion, to become pinched in the mold or unevenly distorted.

With reference to the use of steam as the curing media at a temperature of 370° F. and a pressure of 170 p.s.i., it will be apparent that this is the preferred form. Other media, temperatures and pressures which will retain the bellows structure 10 in the distended form after the shaping fluid is cut off, and will cause the structure to become fully vulcanized, may be employed.

The bellows structure 10 as shown in Fig. 3 incorporates therein a closure disk 19 seated interiorly of the structure adjacent the smaller bead 16. The closure 19 permits the shaping media to be applied whenever the structure 10 is clamped to the bottom mold section 34, without the necessity of the structure having been contacted by the upper mold section 25. In the event that the closure 19 is not a part of the structure 10, the principles of the invention are applicable if the shaping pressure is not applied until the structure contacts the upper mold section in an air tight manner.

While a preferred embodiment of the invention has been shown and described, it will be apparent to those skilled in this art that individual components of applicant's apparatus could be changed or modified without departing from the spirit of the invention. For example, the mold sections could be reversed in order, with the large bead of the bellows being formed in the upper mold section. Accordingly, these and other modifications which are apparent in view of the disclosure herein, are to be deemed within the scope of the subjoined claims.

What is claimed is:

1. Apparatus for use in the shaping and curing of a single convolution air spring bellows from a tubular structure having multiple plies of rubberized fabric with crossed cords of predetermined angular relation, and an open end, comprising an upper mold section, a middle mold section, and a lower mold section, each of said sections having an inner molding surface forming an outer portion of a cured bellows, means for closing said mold sections together with an uncured structure therein, electrical means signalling the closing of said mold sections, a first source of air under a pressure sufficient to change the angular relation of said cords and distend said structure into contact with the forming surfaces of said mold without distortion of the outer surface of said structure, a second source of air at a reduced pressure sufficient to maintain the distended condition of said structure and allow the cords to become stabilized in their distended angular relation, a source of steam under elevated pressure and temperature sufficient to cure said structure, piping connecting said sources to said lower mold section for introduction of air and steam into the open end of said structure, a first valve means acting in response to said electrical means for controlling the passage of said higher pressure air through said piping, a second valve means acting in response to said electrical means for controlling the passage of said reduced pressure air through said piping, and a third valve means for controlling the passage through said piping of steam.

2. Apparatus for shaping and curing an air spring bellows from an uncured tubular structure having a plurality of plies of rubberized fabric and an open end, comprising, a plurality of mold sections having mold cavities conforming to complementary outer portions of the cured bellows, means mounting said mold sections in axial alignment for movement toward and away from each other, means for moving said mold sections together to form a complete mold cavity, means connected to one mold cavity for introducing fluid at an initial pressure into the open end of an uncured tubular structure positioned therein, means for reducing said fluid pressure below said initial pressure, and means for introducing fluid at an elevated temperature and pressure into said uncured tubular structure when fully enclosed within said sectional mold cavity for curing the structure.

3. Apparatus for use in the shaping and curing of a single convolution air spring bellows from an uncured tubular structure having multiple plies of rubberized fabric and an open end, comprising, a plurality of axially aligned and separable mold sections each having an inner molding surface conforming to a portion of the cured bellows, means for axially moving said mold sections together when an uncured structure is placed therein, electrical means signalling the moving together of said mold sections, two sources of similar fluid under different pressures, a third source of fluid under elevated pressure at a temperature sufficient to cure said structure, piping connecting all of said fluid sources to one of said mold sections for passage of said fluids into and from direct contact with the interior of the structure through the open end thereof, valve means acting in response to said electrical means for selectively controlling the passage of fluid through said piping to and from said two sources of fluid, and additional valve means acting in response to said electrical means for controlling the passage of fluid through said piping from said third source of fluid.

4. Apparatus for use in the shaping and curing of a single convolution air spring bellows from an uncured tubular structure having multiple plies of rubberized fabric and an open end, comprising, a plurality of axially aligned and separable mold sections each having an inner molding surface conforming to a portion of the cured bellows, means for axially moving said mold sections together when an uncured structure is placed therein, electrical means signalling the moving together of said mold sections, a first source of fluid under pressure, a second source of fluid at a lower pressure than said first source, a third source of fluid under elevated pressure at a temperature sufficient to cure said structure, piping connecting said fluid sources to one of said mold sections for passage of said fluids into and from direct contact with the interior of the structure through the open end thereof, a first valve means acting in response to said electrical means for controlling the passage of fluid through said piping from said first source of fluid, a second valve means acting in response to said electrical means for controlling the passage of fluid through said piping from said second source of fluid, and a third valve means acting in response to said electrical means for controlling the passage of fluid through said piping from said third source.

References Cited in the file of this patent

UNITED STATES PATENTS

| | | |
|---|---|---|
| 1,887,251 | Stricklen et al. | Nov. 8, 1932 |
| 2,204,531 | Erbguth et al. | June 11, 1940 |
| 2,221,470 | Brown | Nov. 12, 1940 |
| 2,243,532 | Maynard | May 27, 1941 |
| 2,265,346 | Brown et al. | Dec. 9, 1941 |
| 2,272,892 | Taylor et al. | Feb. 10, 1942 |
| 2,340,264 | Freeman | Jan. 25, 1944 |
| 2,814,072 | Soderquist | Nov. 26, 1957 |